US010084402B2

(12) United States Patent
Saw et al.

(10) Patent No.: US 10,084,402 B2
(45) Date of Patent: Sep. 25, 2018

(54) MICROSTEPPER MOTOR CONTROL CIRCUIT PWM OUTPUT COUPLED TO H-BRIDGE GATES

(71) Applicant: Texas Instruments Incorporated, Dallas, TX (US)

(72) Inventors: Sooping Saw, McKinney, TX (US); Anuj Jain, Lewisville, TX (US); Jeffrey Okyere, College Station, TX (US); Wen Chao Qu, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 15/296,031

(22) Filed: Oct. 17, 2016

(65) Prior Publication Data

US 2018/0109213 A1 Apr. 19, 2018

(51) Int. Cl.
*H02P 8/32* (2006.01)
*H02P 8/34* (2006.01)
*H02P 8/12* (2006.01)
*H02P 6/08* (2016.01)

(52) U.S. Cl.
CPC ............... *H02P 8/32* (2013.01); *H02P 6/085* (2013.01); *H02P 8/12* (2013.01); *H02P 8/34* (2013.01)

(58) Field of Classification Search
CPC .... H03K 19/0175; H03K 17/081; H02P 8/32; H02P 6/085; H02P 8/34
See application file for complete search history.

(56) References Cited

U.S. PATENT DOCUMENTS

| 5,216,347 A | 6/1993 | Pace et al. | |
| 2007/0210783 A1* | 9/2007 | Motoyui | H02P 7/2913 323/314 |
| 2008/0061725 A1 | 3/2008 | Wu et al. | |
| 2008/0309274 A1* | 12/2008 | Thomson | H02P 8/12 318/567 |
| 2009/0295350 A1* | 12/2009 | Yamada | H02M 3/1588 323/282 |

(Continued)

OTHER PUBLICATIONS

PCT Search Report for Application No. PCT/US2017/057009, dated Mar. 15, 2018.

*Primary Examiner* — Muhammad S Islam
(74) *Attorney, Agent, or Firm* — Lawrence J. Bassuk; Charles A. Brill; Frank D. Cimino

(57) ABSTRACT

A stepper motor control system includes stepper motor error reduction. For example, first and second power switches respectively energize and de-energize a stepper motor coil during each cycle for pulse-width modulating (PWM) the coil current. During a cycle including a zero crossing microstep, a calibrator detects a type of a body diode effect that occurs in the second power switch when the second switch stops de-energization of the coil. A selected offset is adjusted in response to the type of detection of the body diode effect of the second power switch. Adjusting the selected offset controls the trigger time for a comparator for comparing an offset reference voltage to a motor voltage developed in response to the coil current. Progressively adjusting the selected offset over successive cycles compensates for delays of components in the PWM control loop and reduces errors resulting from, for example, process, voltage, and temperature variations.

10 Claims, 12 Drawing Sheets

(56) References Cited

U.S. PATENT DOCUMENTS

| | | | | |
|---|---|---|---|---|
| 2010/0253250 A1* | 10/2010 | Marvelly | ................ | H02P 6/085 318/3 |
| 2015/0180330 A1* | 6/2015 | Ye | ....................... | H02M 1/4208 363/126 |
| 2015/0311894 A1* | 10/2015 | McIntosh | ........... | H03K 17/6871 318/504 |
| 2016/0065208 A1 | 3/2016 | Moriya | | |

* cited by examiner

MICROSTEPPER MOTOR CONTROL CIRCUIT PWM OUTPUT COUPLED TO H-BRIDGE GATES

BACKGROUND

Controllers (including processors) are increasingly used to control the movement of physical devices such as motors and robots. The controllers control the movement of such physical devices, for example, by controlling stepper motors. Various applications of stepper motors increasingly require greater accuracy and control of the stepper motors. The stepper motors are controlled regulating an amount of current applied to a stepper motor. However, many sources of current regulation inaccuracy exist, and not all of these sources can be compensated for at the time of manufacture of the control circuitry to be used for controlling stepper motors.

SUMMARY

The problems noted above can be addressed in a system and method for performing stepper motor error reduction. A stepper motor error reduction control system includes, for example, first and second power switches respectively energize and de-energize a stepper motor coil during each cycle for pulse-width modulating (PWM) the coil current. During a cycle including a zero crossing microstep, a calibrator detects a type of a body diode effect that occurs in the second power switch when the second switch stops de-energization of the coil. A selected offset is adjusted in response to the type of detection of the body diode effect of the second power switch. Adjusting the selected offset controls the trigger time for a comparator for comparing an offset reference voltage to a motor voltage developed in response to the coil current. Progressively adjusting the selected offset (which adjusts the voltage of the offset reference voltage) over successive cycles compensates for delays of components in the PWM control loop and reduces errors resulting from, for example, process, voltage, and temperature variations.

This Summary is submitted with the understanding that it is not be used to interpret or limit the scope or meaning of the claims. Further, the Summary is not intended to identify key features or essential features of the claimed subject matter, nor is it intended to be used as an aid in determining the scope of the claimed subject matter.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be example of that embodiment, and not intended to intimate that the scope of the disclosure, including the claims, is limited to that embodiment.

Certain terms are used throughout the following description—and claims—to refer to particular system components. As one skilled in the art will appreciate, various names may be used to refer to a component or system. Accordingly, distinctions are not necessarily made herein between components that differ in name but not function. Further, a system can be a sub-system of yet another system. In the following discussion and in the claims, the terms "including" and "comprising" are used in an open-ended fashion, and accordingly are to be interpreted to mean "including, but not limited to . . . ." Also, the terms "coupled to" or "couples with" (and the like) are intended to describe either an indirect or direct electrical connection. Thus, if a first device couples to a second device, that connection can be made through a direct electrical connection, or through an indirect electrical connection via other devices and connections. The term "portion" can mean an entire portion or a portion that is less than the entire portion.

Figure 1:
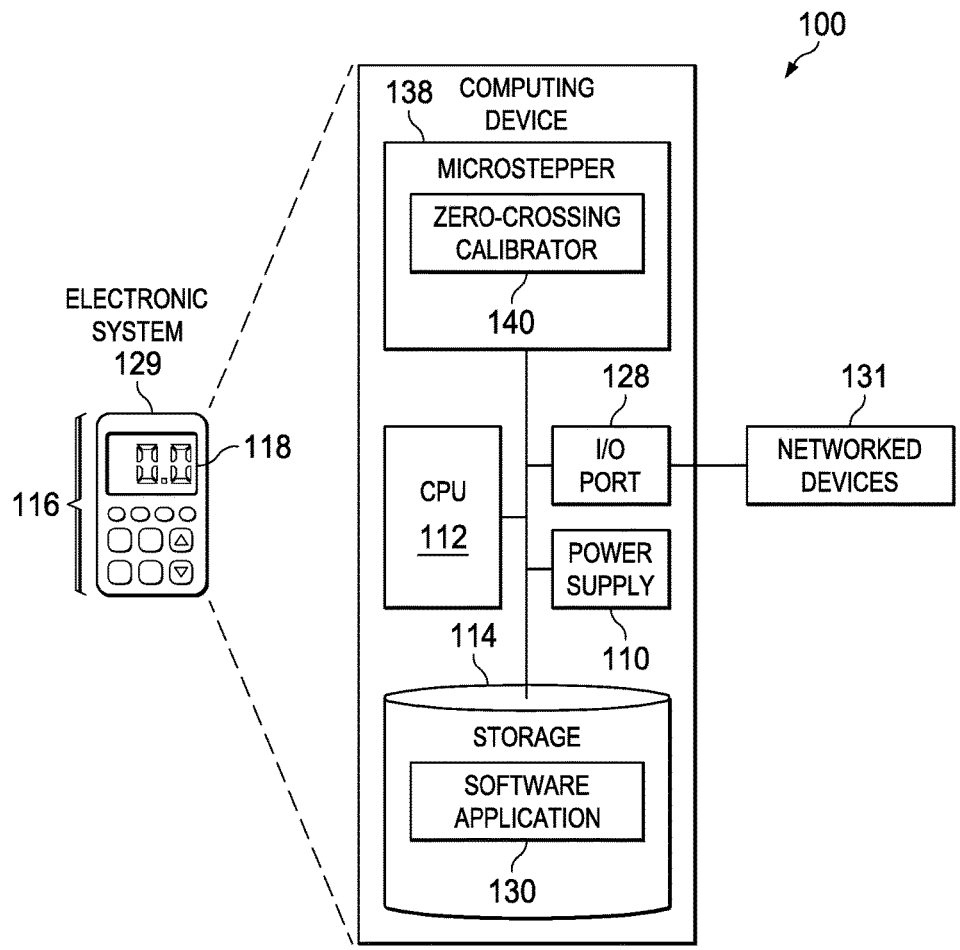
FIG. 1 shows an illustrative computing device 100 in accordance with preferred embodiments of the disclosure.

FIG. 1 shows an illustrative computing device 100 in accordance with preferred embodiments of the disclosure. For example, the computing device 100 is, or is incorporated into, an electronic system 129, such as a computer, electronics control "box" or module, robotics equipment (including fixed or mobile), automobiles or any other type of system where a computer controls physical devices.

In some embodiments, the computing device 100 comprises a megacell or a system-on-chip (SoC) which includes control logic components such as a CPU 112 (Central Processing Unit), a storage 114 (e.g., random access memory (RAM)) and a power supply 110. The CPU 112 can be, for example, a CISC-type (Complex Instruction Set Computer) CPU, RISC-type CPU (Reduced Instruction Set Computer), MCU-type (Microcontroller Unit), or a digital signal processor (DSP). The CPU 112 includes functionality provided by discrete logic components and/or is arranged to execute application-specific instructions (e.g., software or firmware) that, when executed by the CPU 112, transform the CPU 112 into a special-purpose machine. The notional line of "division" between hardware and software is a design choice that (e.g., selectively) varies depending on various tradeoffs including cost, power dissipation, reliability, time to market, and the like. Accordingly, the functionality of any software used to control one or more CPUs 112 of the computing system 100 can be entirely embodied as hardware (e.g., when given sufficient time and resources for design and manufacture).

The CPU 112 comprises memory and logic that store information frequently accessed (e.g., written to and/or read from) from the storage 114. The computing device 100 is often controlled by a user using a UI (user interface) 116, which provides output to and receives input from the user during the execution the software application 130. The output is provided using the display 118, which includes annunciators (such as indicator lights, speakers, vibrators, and the like) and controllers. The input is received using audio and/or video inputs (using, for example, voice or image recognition), and electrical and/or mechanical devices (such as keypads, switches, proximity detectors, gyros, accelerometers, resolvers, and the like).

The CPU 112 is coupled to I/O (Input-Output) port 128, which provides an interface that is configured to receive input from (and/or provide output to) networked devices 131. The networked devices 131 can include any device (including "Bluetooth" units that are electronically paired with the computing device 100) capable of point-to-point and/or networked communications with the computing device 100. The computing device 100 is optionally coupled to peripherals and/or computing devices, including tangible, non-transitory media (such as flash memory) and/or cabled or wireless media. These and other input and output devices are selectively coupled to the computing device 100 by external devices using wireless or cabled connections. The storage 114 is accessible, for example, by the networked devices 131. The CPU 112, storage 114, and power supply 110 can be coupled to an external power supply (not shown) or coupled to a local power source (such as a battery, solar cell, alternator, inductive field, fuel cell, capacitor, and the like).

The storage 114 (which can be memory such as on-processor cache, off-processor cache, RAM, flash memory, data registers, flip-flops, disk storage, and the like) stores one or more software applications 130 (e.g., embedded applications) that, when executed by the CPU 112, transform the computing device 100 into a special-purpose machine suitable for performing one or more targeted functions such as stepper motor error correction.

The computing system 100 includes a microstepping controller (microstepper) 138 arranged to control stepper motors (such as motor 204 discussed below). In accordance with various applications of stepper motors increasingly requiring greater accuracy and control of stepper motors, the microstepper 138 is arranged to control stepper motors requiring finer and more precise motor movement. Controlling the finer and more precise motor movements entails higher levels of microstepping, where the smaller (e.g., excursion between) the micro-steps, the higher the resolution of the stepper positioning. As disclosed herein, the zero-crossing calibrator 140 is arranged to calibrate portions of the microstepper 138 at selected times such the microstepper 138 achieves, for example, smaller micro-steps having higher accuracy of current regulation and positioning of a motor in real space.

Stepper motor driving circuits often perform peak current regulation of the current used to drive and/or control stepper motors. However, the driving circuits for performing peak current regulation are typically manufactured with circuit device variances, where the variances typically result in decrease accuracy (e.g., errors) in controlling a stepper motor. Factory "trimmable" sources of errors in performing peak current include offset errors in reference voltages and comparators used to compare the reference voltages, FET (field effect transistors) variations (e.g., mismatches) between driving FETs and sensing FETs, and errors in circuits for generating reference voltages and reference currents.

However, peak current regulation errors also arise from differences in electrical characteristics of end-user-supplied and/or customer-selected components (collectively, user-supplied components). The user-supplied components often have variations in motor inductances and variations of the voltages of the motor voltage outputs (which are often unknown to the factory manufacturing the motor driving circuits), and accordingly are not typically factory-trimmed. The variations of the motor inductances and voltage outputs affect the accuracy of the drive current (as discussed below with reference to Eq. (2), for example).

The peak current regulation circuits normally are arranged as a feedback loop. Accordingly, errors resulting from motor-related variances (e.g., in the motor inductances and motor voltage supplies) in an end-user system substantially contribute to regulation errors because the peak current consumed by the motor is used to control the motor itself in the feedback loop. Delays in the feedback loop lessen the speed at which the control errors can be corrected (and/or regulated). The control loop delay includes (but is not limited to) current-sensing voltage amplifier and the comparator offset delays, deglitching periods (e.g., for helping allow time for allowing voltage transients to settle), digital control logic latency, and switching periods of FET power drivers.

Figure 2:
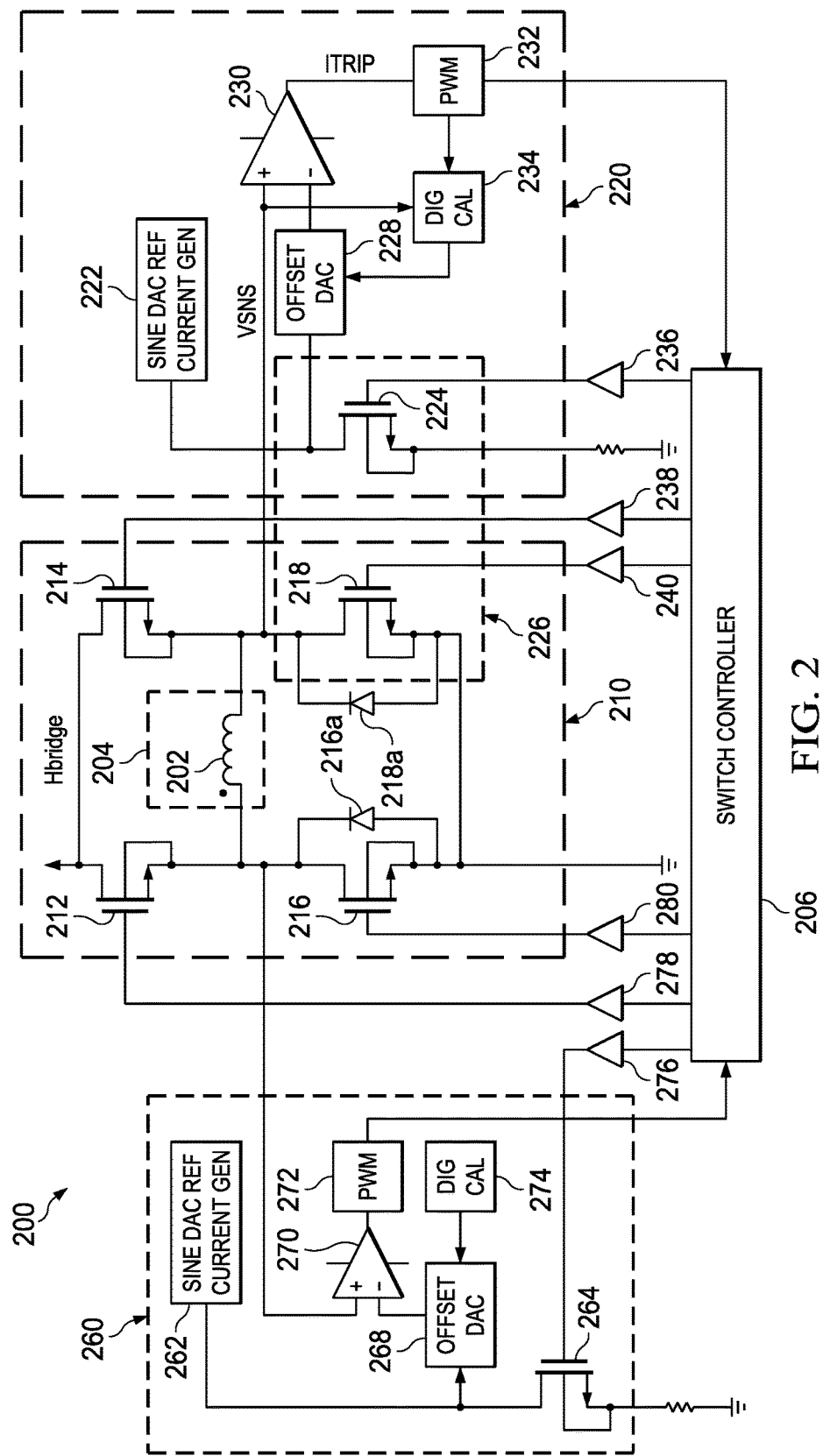
FIG. 2 is a schematic diagram of a circuit for peak current regulation in stepper motor error reduction in accordance with embodiments of the present disclosure.

FIG. 2 is a schematic diagram of a circuit for peak current regulation in stepper motor error reduction in accordance with embodiments of the present disclosure. Zero-crossing-calibrated microstepper 200 is a microstepper such as microstepper 138 discussed above. The zero-crossing-calibrated microstepper 200 includes an "H-bridge" (e.g., which is so-named in accordance with its typically depicted schematic shape) 210, a first direction (e.g., forwards) microstepper control circuit 220, and a second direction (e.g., backwards) microstepper control circuit 260. The H-bridge 210 is selectively driven under control of the switch controller 206 (which in turn is controlled responsively to the microstepper control circuits 220 and 260).

In operation, the zero-crossing-calibrated microstepper 200 is arranged to controllably drive the (e.g., stepper) coil 202 via "H-bridge" 210. The microstepper control circuit 220 is arranged to controllably drive the coil 202 (and in turn the motor 204) in a first direction by alternately driving a first pair of NMOS (N-type metal oxide semiconductor) FETs (field-effect transistors) 214 and 218. The source of the upper FET 214 is coupled to the drain of the lower FET 218 and to a first terminal of a (e.g., motor) coil 202, where the second terminal of the coil 202 is switchably coupled to ground via an opposing (e.g., opposite side of the H-bridge 210) lower FET 216. When the motor 204 is to be driven in a first direction, the opposing lower FET 216 is driven (e.g., to switchably close the opposing lower FET 216) to couple the second terminal of the coil 202 to ground. The coil 202 is selectively energized by closing the upper FET 214 for a first selected time (where the selected time is selected in accordance with the inductance of the coil 202, the voltages developed across the coil 202, and a specified degree of rotation of the motor 204). At the end of the first selected time, the upper FET 214 is opened (e.g., by lowering the gate voltage of the upper FET 214) and the lower FET 218 is selectively closed (e.g., which de-energizes the coil 202 such that the motor 204 is no longer inductively driven). The lower FET 218 is selectively closed in response to a first PWM (pulse-width modulated) signal generated by the microstepper control circuit 220.

Accordingly, a first power switch 214 is for selectively coupling a coil current to energize a stepper motor coil 202 in response to asserting a first control signal and a second power switch 218 is for selectively coupling the coil current to de-energize the stepper motor coil 202 in response to asserting a second control signal, wherein the second control signal is one of asserted and de-asserted in response to the comparison of the offset reference voltage to the motor voltage.

In a similar manner, the microstepper control circuit 260 is arranged to controllably drive the coil 202 in a second direction (opposite to the first direction) by alternately driving a second pair of FETs 212 and 218. The source of the upper FET 212 is coupled to the drain of the lower FET 216 and to the second terminal of a (e.g., motor) coil 202, where the first terminal of the coil 202 is switchably coupled to ground via an opposing (e.g., opposite side of the H-bridge 210) lower FET 218. When the motor 204 is to be driven in the second direction, the opposing lower FET 216 is closed to couple the first terminal of the coil 202 to ground. The coil 202 is selectively energized by closing the upper FET 212 for a selected time. At the end of the selected time, the upper FET 212 is opened and the lower FET 216 is selectively closed (e.g., which de-energizes the coil 202 such that the motor 204 is no longer inductively driven). The lower FET 216 is selectively closed in response to a second PWM signal generated by the microstepper control circuit 260.

The switch controller 206 is arranged to selectively drive (e.g., logic level-to-drive level) buffers of the H-bridge such that current flows through the coil 202 in a selected direction. For example, the microstepper control circuit 220 drives the coil 202 in a first direction by driving buffer 278 (e.g., to ground the second terminal of the coil 202), by driving buffer 240 (e.g., to energize the coil 202), and by selectively driving the buffer 238 (e.g., to de-energize the coil) in response to a first PWM signal (e.g., for driving the gate of FET 218). In a similar manner, the microstepper control circuit 260 drives the coil 202 in a second direction (e.g., opposite the first direction) by driving buffer 238 (e.g., to ground the second terminal of the coil 202), by driving buffer 280 (e.g., to energize the coil 202), and by selectively driving the buffer 278 (e.g., to de-energize the coil) in response to a second PWM signal (e.g., for driving the gate of FET 216).

The microstepper control circuit 220 controllably drives the coil 202 in a first direction by generating and asserting the first PWM signal (e.g., applied to the buffer 238). The first PWM signal is a feedback control signal of a feedback loop such that the microstepper control circuit 220 measures an output of the motor 204 (e.g., current from the coil 202 which is converted a voltage developing a drain-to-source voltage across emulation FET 224) to generate the first PWM signal for controlling the motor 204.

The comparator 230 is arranged to generate the first PWM signal in response to comparing (for example) a coil 202 output voltage (e.g., the sensing voltage VSNS) with a first selected emulation voltage. The sensing voltage VSNS signal is (for example) the drain-to-source voltage developed at the drain of FET 218 in response to the coil 202 control current flowing through the FET 218. The first selected emulation voltage is generated (for example) by programming (e.g., in response to a processor—such as CPU 112—arranged to control programmable components of the zero-crossing-calibrated microstepper 200) the sine DAC (digital-to-analog converter) current generator 222 to generate a programmably selected output current. (The programmably selected output current is associated with a microstep position, for example, as discussed below with respect to FIG. 8). The programmably selected output current is converted into the first selected emulation voltage by developing a drain-to-source voltage (VDS) across emulation FET 224 in response to the programmably selected output current.

Accordingly, the first selected reference current is applied to the drain of a reference transistor 224 such that the first emulation voltage is developed at the drain of FET 224 when the buffer 236 (e.g., controlled in response to the first PWM signal) is driven. The FET 224 is structurally and chemically formed in a similar manner to FET 218 (which forms an emulation circuit 226) such that PVT variations of FET 224 are similar to PVT variations of FET 218 (such that operational fluctuations resulting from of PVT are removed by operation of common-mode subtraction of the comparator 230), and the functionality of the FET 218 is emulated (e.g., without having to affect the operation of FET 218 itself to perform the measurement).

The offset DAC 228 is arranged to selectively offset the first emulation voltage in response to a code (e.g., indicating the amount of offset) received from the digital calibrator (DIG CAL) 234. As disclosed herein, the digital calibrator 234 determines an optimized offset for the first emulation voltage by determining whether overshoot and/or undershoot occurs in response, for example, to a succession of selectively adjusted offset emulation voltages. For example, a search (e.g., linear or binary) for determining a coil 202 control current zero-crossing is performed by progressively and selectively adjusting control loop delay (e.g., by programmatically adjusting the amount of offset of the first emulation voltage) for successive coil 202 cycles such that an increasingly narrower time window is determined in which the coil 202 control current zero-crossing occurs. The use of the particular offset that results in an overshoot condition rather than (e.g., closest to) an undershoot condition minimizes the length of time of either an undershoot or an overshoot occurring in successive cycles and/or steps (e.g., microsteps) of the motor 204.

The digital calibrator 234 is arranged to determine whether an overshoot or an undershoot occurs for a particular cycle (e.g., during a search for a narrow window around a zero crossing point) by examining the body diode effects of the lower FET 218. As discussed below with reference to FIG. 9 and FIG. 10, the sensing voltage VSNS signal achieves a positive body-diode (218a or 216a) voltage in the event of a coil 202 control current overshoot or a negative body-diode voltage in the event of an undershoot of the coil 202 control current (e.g., where the coil 202 control current changes direction at a zero-crossing).

In response to the determination of whether an overshoot or an undershoot has occurred (e.g., during a calibration routine for finding an optimized offset), the digital calibrator 234 generates a code for indicating a voltage offset for compensating for the control loop delay of the control loop for generating the first PWM signal. The digital calibrator 234 operates responsively to control circuitry (such as a processor and/or other programmable components of the zero-crossing-calibrated microstepper 200). Under such control, for example, the digital calibrator 234 can be used to effectively measure the timing of the results of the comparator 230 (as discussed below) by successively adjusting the selected offset in response to the undershoot/overshoot determination. In response to the undershoot/overshoot determination, the offset DAC 228 generates a (e.g., selectively adjusted) offset emulation voltage, which adjusts timing of the first PWM signal to compensate for control loop delays. Accordingly, the calibrator 234 is for detecting a body diode (e.g., 218a) effect of the second power switch 218 occurring in response to de-asserting the second power switch 218 and adjusting a selected offset (e.g., 1202 of FIG. 12) in response to the detection of the body diode effect of the second power switch 218.

The comparator 230 is arranged to compare the first offset emulation (e.g., reference) voltage to the motor voltage VSNS developed in response to the coil current (e.g., the FET 218 VDS generated in response to the coil 202 current output) to generate the "ITRIP" current control signal for controlling the PWM generator 232. As disclosed herein, a change in the offset of the first offset emulation voltage determines a corresponding change in the timing (e.g., earlier or later) of the assertion of the ITRIP signal. The digital calibrator 234 is arranged to measure (e.g., via comparator 230) the behavior of the coil 202 output current with respect to the amount of peak current generated in response to a zero crossing. In response to the measured behavior, the digital calibrator 234 is arranged to determine an offset code for changing the timing of the ITRIP trigger levels. The determined offset code is determined such that, for example, the loop delay (which often results in overshoots in current leading to motor positioning errors) is selectively controlled to help minimize the extents and occurrences of undershoots and overshoots of the coil 202 output current, which normally results in inaccuracies of the controlled (e.g., stepper) coil 202.

In a similar manner to the microstepper control circuit 220, the microstepper control circuit 260 controllably drives the coil 202 in a second direction (e.g., opposite the first direction). Accordingly, the microstepper control circuit 260 is arranged to generate and assert the second PWM signal (e.g., applied to the buffer 278). The second PWM signal is generated in response to comparing (for example) the VDS of FET 216 (developed in response to the coil 202 output current) with a second offset emulation voltage. The second offset emulation voltage is generated (for example) by programming the sine DAC reference current generator for outputting a second selected reference current. The second selected reference current is applied to the drain of a reference transistor 264 such that a second emulated voltage is developed at the drain of FET 264 when the buffer 276 (e.g., controlled by the second PWM signal) is driven. The FET 264 is structurally and chemically formed in a similar manner to FET 216 (e.g., such that PVT variations of FET 264 are similar to PVT variations of FET 216), and such that the functionality of the FET 216 is emulated.

The second emulated voltage is applied to an input of the offset DAC 268 such that (for example) the second offset emulation voltage is generated in response to the second emulation voltage and a selected (e.g., programmably adjustable) offset. The second offset emulated voltage is selectively offset in response to (for example) a selected microstep and a measured behavior of the coil 202 output current.

The second offset emulated voltage is compared with the VDS of FET 216 (developed in response to the coil 202 output current) to generate an "Itrip" current control signal for controlling the PWM generator 272. The digital calibrator 274 is arranged to measure (e.g., via comparator 270) the behavior of the coil 202 output current (e.g., the amount of peak current generated in response to a zero crossing). In response to the measured behavior, the digital calibrator 274 is arranged to determine an offset (e.g., compensating trigger point) changing the timing of the Itrip level. Controlling the voltage (and timing) of the compensating trigger point controls, for example, the loop delay (e.g., of the microstepper control circuit 260) to help avoid undershoots and overshoots of the coil 202 output current.

Figure 3:
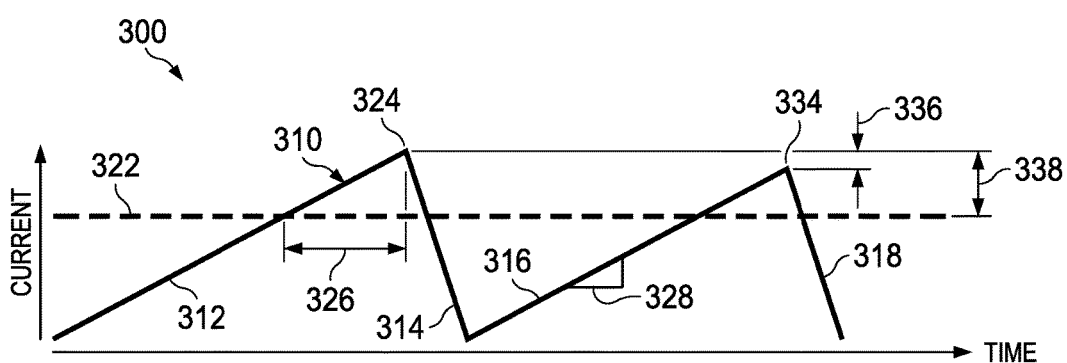
FIG. 3 is a waveform diagram of a stepper motor control current for stepper motor error reduction in accordance with embodiments of the present disclosure.

FIG. 3 is a waveform diagram of a stepper motor control current for stepper motor error reduction in accordance with embodiments of the present disclosure. Current waveform 300 is illustrated having a waveform portions 310 and 312 of rising stepper motor control current (e.g., flowing through coil 202). As the waveform portion 312 rises (and the coil of the coil 202 is energized with a first polarity), the level of the stepper motor control current rises above a target threshold 322 (e.g., a selected peak level of current associated with a selected microstep level). Ideally, an FET drive transistor (e.g., the lower FET 218) would be instantaneously turned on (e.g., toggled to a conductive state) when the waveform portion 312 reaches the target threshold 322 (e.g., such that the forward stepper motor control current is reduced).

However, the delay period 326 of the control loop (discussed above, for example) results from the latency of the control loop before the lower FET (e.g., FET 218) is activated. During the delay period 326, for example, the stepper motor control current continues to increase as indicated by wave portion 310. After the delay period 326 (e.g., during which the results of the comparison have propagated through the circuitry used to control the lower FET), the lower FET is turned on at point 324 (e.g., which represents a peak current). When the lower FET is turned on, the stepper motor control current starts to decrease (e.g., fall) in response to the de-energizing of the coil of coil 202 as illustrated by waveform portion 314. The peak current overshoot of the stepper motor control current above the target threshold 322 is considered to be an error (e.g., because the overshoot results in inaccuracies of positioning the coil 202) having a magnitude illustrated as error 338.

As waveform portion 314 falls below a lower threshold (such as the zero reference level, discussed below, for example, with reference to FIG. 5 and FIG. 8), a comparator detects the crossing and turns off the lower FET transistor. In response to the lower FET transistor being turned off, the waveform portion 316 (e.g., the stepper motor control current flowing through coil 202) rises, the level of the stepper motor control current rises above a target threshold 322. The waveform portion 316 has a slope 328 (e.g., instantaneous rate, slew rate, first derivative, and the like) in accordance with:

$$\frac{di}{dt} = \frac{V}{L} \quad (1)$$

where i is the stepper motor control current, t is time, V is the stepper motor control voltage, and L is the inductance of the stepper motor. Accordingly, the slope 328 is determined in response to the inductance and resulting voltages of the customer-selected (for example) motor.

The delay period 326 of the control loop also contributes towards an overshoot of the motor control current. As disclosed herein, the delays 326 can be shortened in accordance with Equation (1). For example, by adding an (e.g., voltage) offset (via offset DAC 228) to a comparison voltage at the inverting input of a comparator (e.g., comparator 230), the comparator is forced to toggle (e.g., causing a falling segment 318) at an earlier time than otherwise. As discussed below with reference to FIG. 9, the voltage developed by the motor control current is inversely related to the motor control currents, for example, during waveform portions 312, 310, and 316 such that, for example, a higher offset compensates for (e.g., causes a reduction in) the loop delay. The shortened loop delay results in a smaller overshoot as illustrated by error 336 (which is less than the error 338). From Eq. (1), the peak current overshoot ($I_{err}$) of the stepper motor control current can be determined in accordance with:

$$I_{err} = (loop_{delay})\left(\frac{V_{motor}}{L_{motor}}\right) \quad (2)$$

Accordingly, reducing the loop delay also reduces the current error (e.g., peak current overshoot).

Figure 4:
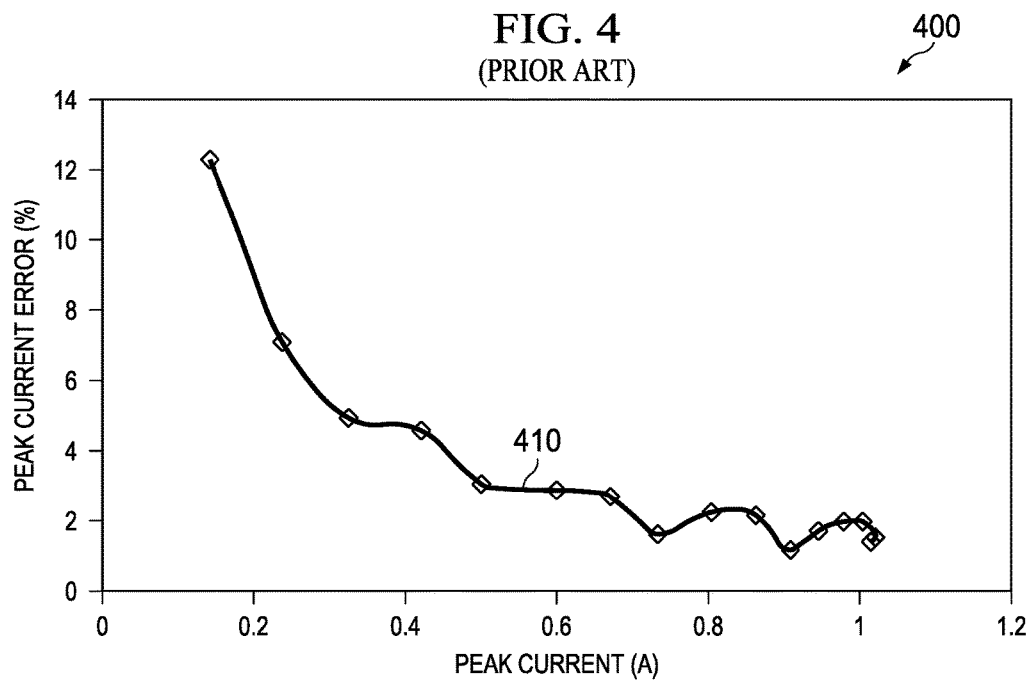
FIG. 4 is a waveform diagram 400 illustrating peak current error percentages per peak currents in a conventional stepper motor controller.

FIG. 4 is a waveform diagram 400 illustrating peak current error percentages per peak currents in a conventional stepper motor controller. For example, a peak current of around one ampere has an associated peak current error of around 2 percent. Similarly, a peak current of around 400 milliamps has an associated peak current error of around 5 percent. However, a peak current of around 150 milliamps has an associated peak current error of over 13 percent. Accordingly, as motors tend to be made increasingly smaller and using increasingly smaller drive and/or control currents, the resulting peak current errors in conventional circuits are compounded at even increasingly higher rates.

Figure 5:
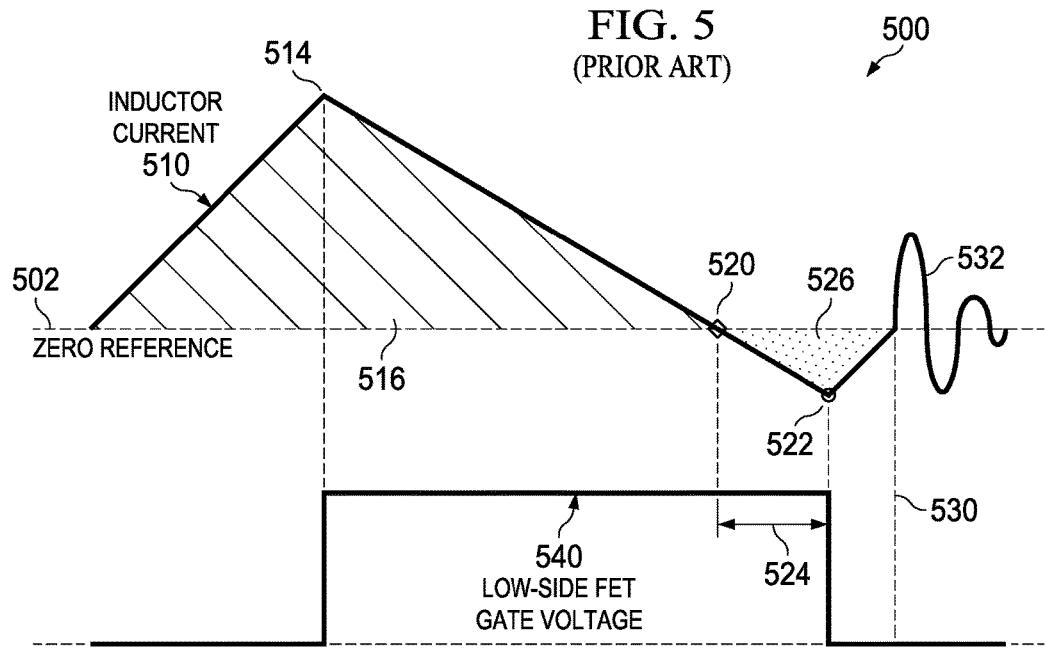
FIG. 5 is a waveform diagram 500 of a single period of a comparatively high stepper motor control current for stepper motor error reduction in accordance with embodiments of the present disclosure.

FIG. 5 is a waveform diagram 500 of a single period of a comparatively high stepper motor control current for stepper motor error reduction in accordance with embodiments of the present disclosure. The waveform diagram 500 includes a current 510, which rises from (for example) a zero reference level 502 to a peak level 514 (at which time the current 510 reaches a peak current level).

The current 510 falls from the peak level 514 in response to the rise of the low-side FET gate voltage 540 (which is illustrated as being asserted substantially contemporaneous with the peak level segment 514). The low-side FET gate voltage 540 is asserted, for example, in response to a comparator comparing an offset emulated voltage with the voltage developed at the drain of the voltage low-side FET (e.g., such as described above with respect to the FET 216 and the comparator 230). The current 510 falls from the peak level 514 and crossed the zero reference level 502, for example, such that the area 516 represents the summation of the error of the positive regulated current.

As the current 510 falls below the zero reference level 502 (and becomes a negative current at point 520), the comparator detects the crossing and negates the assertion (e.g., de-asserts) low-side FET gate voltage 540, which turns off the lower FET transistor at point 522. However, delays in the comparator and predrivers (e.g., PWM 232 and buffer 238) delay the de-assertion (e.g., the falling edge) of the low-side FET gate voltage 540 by a delay 524. Accordingly, the delays contribute to errors in the timing of the zero crossing.

When the lower FET transistor turns off, the current 510 begins to rise from a negative peak level 522 to the zero reference 502 level, such that such that the area 526 represents the summation of the error of the negative regulated current. When the (e.g., negative) current 510 once again reaches the zero reference 502 level, the current 510 oscillates (e.g., rings in response to both the upper and lower FETs being turned off).

Figure 6:
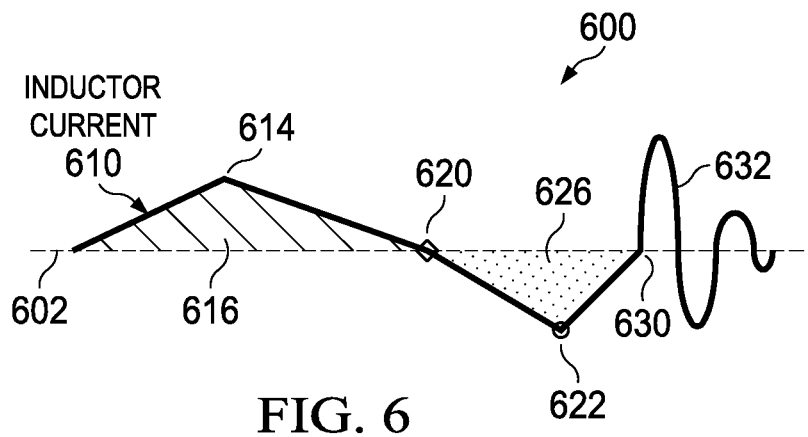
FIG. 6 is a waveform diagram 600 of a single period of a comparatively low stepper motor control current for stepper motor error reduction in accordance with embodiments of the present disclosure.

FIG. 6 is a waveform diagram 600 of a single period of a comparatively low stepper motor control current for stepper motor error reduction in accordance with embodiments of the present disclosure. The waveform diagram 600 includes a current 610, which rises from (for example) a zero reference level 602 to a peak level 614 (at which time the current 610 reaches a peak current level). In contrast with current 510, current 610 has a relatively low peak current, which results in substantially greater errors.

The current 610 falls from the peak level 614 in response to the rise of the low-side FET gate voltage. The current 610 falls from the peak level 614 and crossed the zero reference level 602, for example, such that the area 616 represents the summation of the error of the positive regulated current. Because of the lower peak current for example, the area 616 is substantially less than the area 516.

As the current 610 falls below the zero reference level 602 (and becomes a negative current at point 620), the comparator detects the crossing and negates the assertion (e.g., de-asserts) low-side FET gate voltage, which turns off the lower FET transistor at point 622. When the lower FET transistor turns off, the current 610 begins to rise from a negative peak level 622 to the zero reference 602 level, such that such that the area 626 represents the summation of the error of the negative regulated current. Because the negative excursion of the current 610 (e.g., over point 620 to point 622) is substantially entirely due to the regulation loop, the area 626 is proportionately larger (e.g., with respect to the area 616). Accordingly, at low current levels, the zero crossing detection inaccuracies can result in realizing a zero average current or even negative average currents. When the (e.g., negative) current 610 once again reaches the zero reference 602 level, the current 610 oscillates (e.g., rings).

Figure 7:
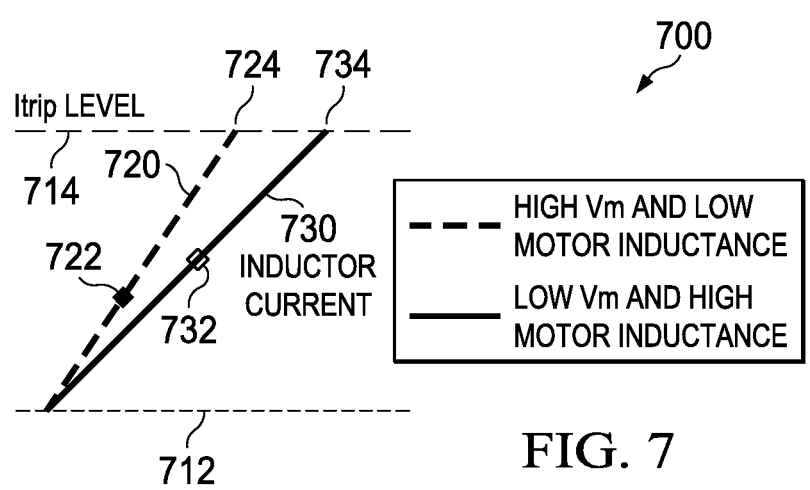
FIG. 7 is a waveform diagram 700 illustrating effects of stepper motor inductance and output voltage variables on the slew rate of motor control currents for stepper motor error reduction in accordance with embodiments of the present disclosure.

FIG. 7 is a waveform diagram 700 illustrating effects of stepper motor inductance and output voltage variables on the slew rate of motor control currents for stepper motor error reduction in accordance with embodiments of the present disclosure. The waveform diagram 700 includes a first inductor (e.g., of a motor coil) current 720 and a second inductor current 730. The first inductor current 720 and the second inductor current 730 are illustrated as having positive slopes such that the first inductor current 720 and the second inductor current 730 are superimposed with respect to a time at which the first inductor current 720 and the second inductor current 730 cross a (e.g., zero-crossing) reference point.

The first inductor current 720 is generated by (for example) a motor having a relatively high motor output voltage (Vm) and relatively low motor inductance, whereas the second inductor current 730 is generated by (for example) a motor having a relatively low motor output voltage and relatively high motor inductance. The effects of stepper motor inductance and output voltage variables on the slew rates of the first and second inductor currents include the first and second inductor currents reaching the peak current threshold Itrip level 714 at different times.

For example, the first inductor current 720 reaches the Itrip level 714 at point 724, whereas the second inductor current 730 reaches the Itrip level 714 at point 734. In accordance with the present disclosure, different motor voltage and motor inductors require different triggering point compensation. The triggering point compensation is arranged to control the timing of the shutdown of the FET at a point (e.g., compensating triggering point) in time (and voltage) that is earlier (and lower) than the Itrip level such the FET is turned off ideally at the time an (e.g., arbitrary) inductor current reaches the Itrip level. Accordingly, the first inductor current 720 is associated with a first compensating trigger point 722, which is different from a second compensating trigger point 732, which is associated with the second inductor current 724. The compensating trigger points vary in accordance with PVT variations and are determined in accordance with a (e.g., runtime calibration routine) zero-crossing timing measurements as disclosed herein.

Figure 8:
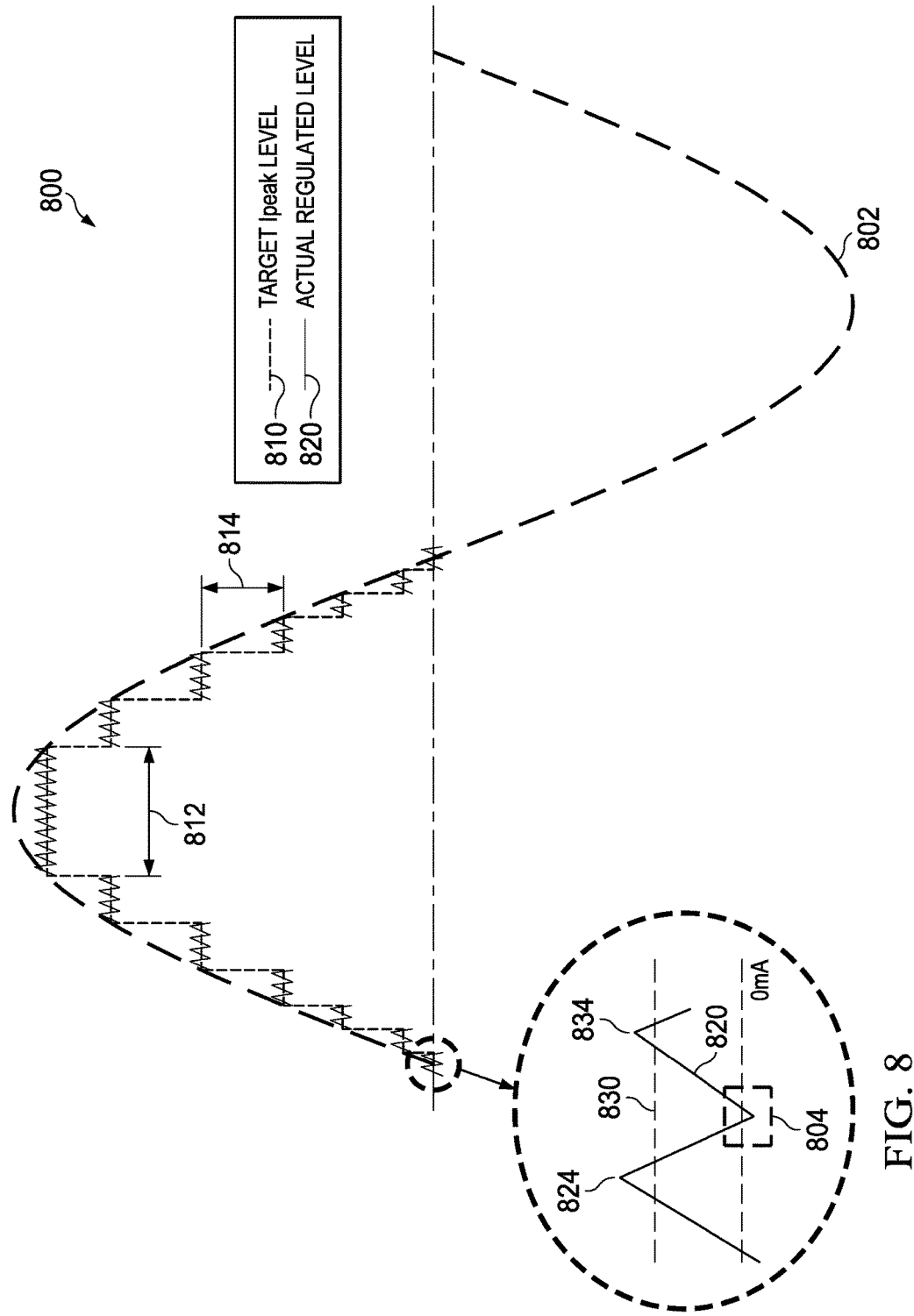
FIG. 8 is a waveform diagram 800 illustrating loop-delay timing information extraction for stepper motor error reduction in accordance with embodiments of the present disclosure.

FIG. 8 is a waveform diagram 800 illustrating loop-delay timing information extraction for stepper motor error reduction in accordance with embodiments of the present disclosure. The waveform diagram 800 includes an (e.g., notional) sinusoidal waveform 802 for indicating an ideal current for driving an (e.g., ideal) stepper motor through a full rotation. The full rotation is divided into various microsteps, each having an associated time delta 812 and current delta 814. As the stepper motor "steps" through a full rotation, the target peak current (Ipeak) level is selected for each such microstep in accordance with a currently specified degree of rotation. Accordingly, the target Ipeak level waveform 810 includes discrete steps determined in accordance with the (e.g. generally enveloping) sinusoidal waveform 802. The disclosed reduced-error microstepper (e.g., microstepper 138) controls the stepper motor current to actual regulated levels 820, which is regulated with respect to different current levels between adjacent steps.

The disclosed reduced-error microstepper is calibrated by a zero-crossing calibrator 140 at a zero crossing and the calibration is used to adjust (e.g., "fine tune") a compensating trigger point for successive steps (including microsteps) in accordance with the present disclosure. Accordingly, the microstepper 138 achieves, for example, smaller microsteps having higher accuracy of current regulation and positioning of a motor in real space.

For example, the actual regulated level 820 of the coil control current achieves an (e.g., erroneously high) level 824 that exceeds the Ipeak current level 830 associated with a step associated with the zero-crossing level (0 milliamps) of current. When the actual regulated level 820 exceeds the Ipeak current level 830, the results of the comparison propagate to the (e.g., lower) FET driving the actual regulated level 820 at around time 824. In response to the turning off of the FET driver, the actual regulated level 820 falls below the zero crossing level around time period 804.

As disclosed herein, the loop-delay timing information can be extracted based on the switching node voltage behavior after the FET driver shut off at a zero-crossing point (as discussed below with reference to FIG. 9 and FIG. 10, for example). A compensating trigger point is selected in response to the measured loop-delay timing and translated into DAC voltage (e.g., for offsetting a comparison voltage) in accordance with Eq. (2) discussed above. The DAC voltage is used to offset a reference voltage (to generate the compensating trigger point voltage) against which the motor voltage is compared at each subsequent step (e.g., such that effects of the loop-delay error are minimized at subsequent IPEAK detection levels.

For example, the actual regulated level 820 (in response to the turning on of the FET driver) rises from the zero crossing level around time period 804 to a level 834. The level 834 is lower than the level 824 because loop delay is effectively shortened by the compensating trigger point causing the comparator to toggle earlier (e.g., earlier than a toggling from a uncompensated comparison of the Itrip level and the motor output level Vm).

Figure 9:
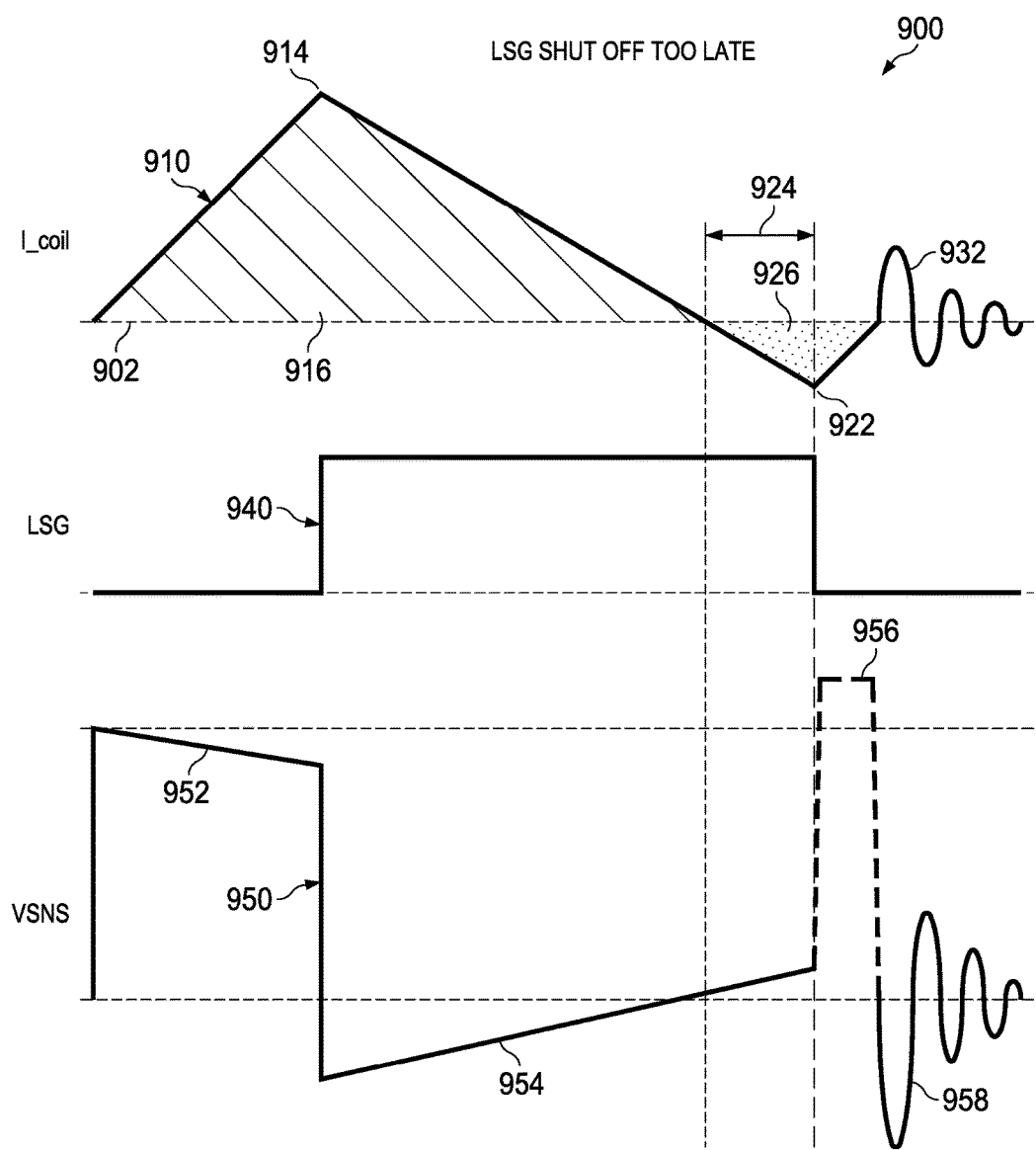
FIG. 9 is a waveform diagram 900 illustrating loop-delay timing information of an overshoot condition in accordance with embodiments of the present disclosure.

FIG. 9 is a waveform diagram 900 illustrating loop-delay timing information of an overshoot condition in accordance with embodiments of the present disclosure. The waveform diagram 900 includes a coil current (I_coil) 910, a low-side gate voltage 940, and a sensing voltage (VSNS) signal 950. The coil current 910 rises from (for example) a zero reference level 902 to a peak level 914 in response to the upper FET (e.g., 214) being turned on. Accordingly, the voltage 950 (which is developed in response to coil current 910) falls over the time period 952.

A first comparison is performed during time period 952 to determine when to turn off the upper FET and to turn on the lower FET (e.g., 218). The voltage 910 is compared against a first selected offset emulation voltage (such as generated by offset DAC 228, where the first selected energizing offset is for compensating for the loop delay of the control loop as the coil current 910 rises). As discussed above with reference to FIG. 8, the first selected offset emulation voltage is determined in a calibration search routine. In an embodiment of the calibration search routine, the selected offset is gradually increased over successive cycles (e.g., that include coil current zero crossings) to determine the closet (e.g., last) energization offset that results in an overshoot condition (rather than an undershoot condition). The selected offset is adjusted by incrementing a previously selected offset to compensate for latencies in the control loop caused by at least one of the modulator, the second switch, and the comparator circuit.

When the voltage 910 falls below the level of the selected emulation voltage, the upper FET is turned off and the lower FET is turned on in response to the low-side FET gate voltage 940. Accordingly, the coil current 910 starts to fall from peak level 914 and the voltage 910 (e.g., rapidly) switches to a negative voltage and begins to rise (e.g., gradually) over time period 954.

A second comparison is performed over time period 954 to determine when to turn off the lower FET (e.g., 218). The voltage 910 is compared against a second selected offset emulation voltage (such as generated by offset DAC 228, where the second selected offset is for compensating the loop delay of the control loop as the coil current 910 falls). The de-energization offset for the second selected offset emulation voltage is determined in response to the energization offset of the first selected offset emulation voltage determined by the calibration search routine (e.g., of the same cycle for coil energization/de-energization). In an embodiment, the de-energization offset for the second selected offset emulation voltage is determined in response to the time period (for offsetting the loop delay) associated with the energization offset of the first selected offset emulation voltage and in response to the estimated slope of the coil current 910 (and/or voltage 950) over time period 954. In an embodiment, a single comparator (e.g., 230) and offset DAC (e.g., 228) are used to perform the first and second comparisons where the output of the comparator is gated such that comparisons are (e.g., only) performed during valid portions of the time periods 952 and 954 and the appropriate offset (e.g., one of energization and de-energization) has been programmed into the offset DAC for generating a respective first and second selected offset emulation voltage.

As the voltage 950 rises above the level of the second selected offset emulation voltage, the low-side gate voltage 940 is driven low (e.g., de-asserted) such that the lower FET is turned off. When the lower FET is turned off, the coil current is blocked in response to the de-assertion of the second control signal (when the first control signal for the upper FET is in a de-asserted state). Accordingly, the coil current 910 starts to rise from negative level 922 such that after the coil current 910 rises above the zero reference 902 level, the current coil 910 oscillates as ringing 932. Also when the lower FET is turned off (and the upper FET remains turned off), a reverse recovery charge flows through the body diode (e.g., 218a) of the lower FET, causing the voltage 950 to rise sharply and peak at the overshoot peak voltage level 956. The overshoot peak voltage level 956 is "clamped" at (e.g., limited to) a Vd (breakdown voltage of the body diode) level above the highest voltage reached previously by the waveform portion 952 of the VSNS signal. Accordingly, the body diode effect occurs during a portion of a coil current cycle in which the second control signal is de-asserted, the first control signal is (e.g., remains) in a de-asserted state, and a zero crossing of the coil current occurs in response to a selected microstep for controlling a degree of rotation of a motor of the stepper motor coil.

The digital calibrator 234 detects the condition of the overshoot and/or undershoot relatively quickly by using, for example, a fast, low-gain comparator, a polarity detector, a diode bridge, and the like to determine the polarity of the VSNS signal when the body diode of the lower FET conducts (e.g., shortly after and/or in response to the falling of the low-side gate voltage 940). For example, the VSNS signal is positive (e.g., reaching the positive overshoot peak voltage level 956 a forward breakdown voltage above the maximum VSNS without the body-diode effect) in an overshoot condition. When the VSNS signal is negative, the VSNS signal decreases to a −Vd (negative forward body diode voltage below the minimum VSNS without the body-diode effect), where the negative-voltage undershoot peak voltage level 1056 is reached during an undershoot condition as described below with reference to FIG. 10. Accordingly, the digital calibrator 234 is operable to determine whether an overshoot or an undershoot condition has occurred in response to a selected offset (and/or determined time delay).

In an embodiment where a linear search is performed (e.g., by progressively making the offset larger and/or associated time period longer), if an undershoot is not detected, the offsets (energization and de-energization) for the next (e.g., tested) cycle for the first selected offset emulation voltage is incrementally increased over the most recent (e.g., previously tested) cycle. Accordingly the time period 924 successively becomes less and less, and the degree of overshoot is reduced each tested cycle. Successive cycles (involving a zero crossing) are successively tested until an undershoot is detected. When the undershoot is detected, non-provisional energization and de-energization offsets for successive (e.g., non-zero-crossing) microsteps are selected (and/or determined) in reponse to the closest (e.g., last) energization and/or de-energization offset (and/or time delay associated therewith) for which an undershoot condition was detected.

Figure 10:
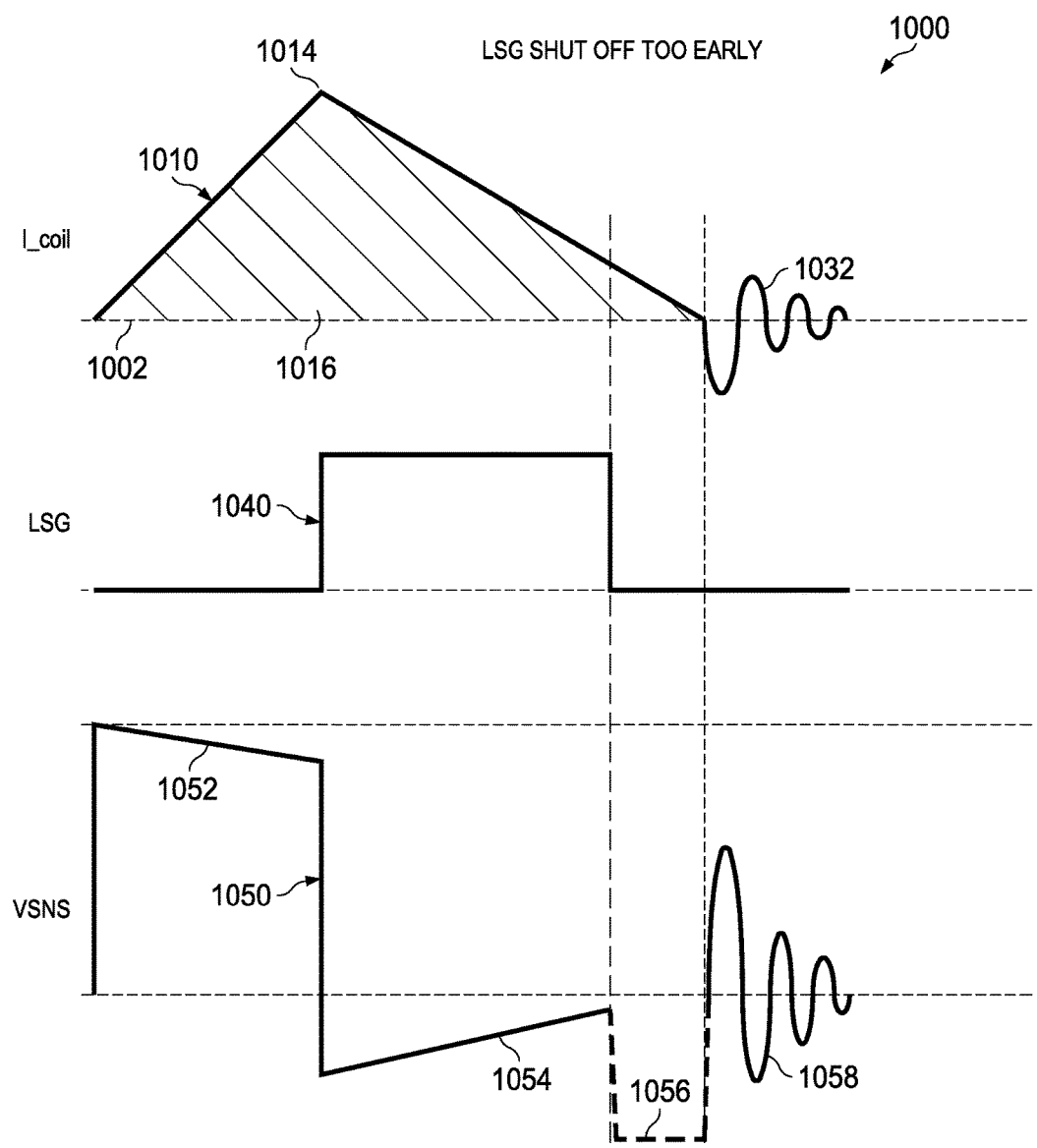
FIG. 10 is a waveform diagram 1000 illustrating loop-delay timing information of an undershoot condition in accordance with embodiments of the present disclosure.

FIG. 10 is a waveform diagram 1000 illustrating loop-delay timing information of an undershoot condition in accordance with embodiments of the present disclosure. The waveform diagram 1000 includes a coil current (I_coil) 1010, a low-side gate voltage 1040, and a sensing voltage (VSNS) 1050. The coil current 1010 rises from (for example) a zero reference level 1002 to a peak level 1014 in response to the upper FET (e.g., 214) being turned on. Accordingly, the voltage 1050 (which is developed in response to coil current 1010) falls over the time period 1052.

A first comparison is performed during time period 1052 to determine when to turn off the upper FET and to turn on the lower FET (e.g., 218). The voltage 1010 is compared against a first selected offset emulation voltage (such as generated by offset DAC 228, where the first selected energizing offset is for compensating for the loop delay of the control loop as the coil current 1010 rises).

When the voltage 1010 falls below the level of the selected emulation voltage, the upper FET is turned off and the lower FET is turned on in response to the low-side FET gate voltage 1040. Accordingly, the coil current 1010 starts to fall from peak level 1014 and the voltage 1010 (e.g., rapidly) switches to a negative voltage and begins to rise (e.g., gradually) over time period 1054.

A second comparison is performed over time period 1054 to determine when to turn off the lower FET (e.g., 218). The voltage 1010 is compared against a second selected offset emulation voltage. The de-energization offset for the second selected offset emulation voltage is determined in response to the energization offset of the first selected offset emulation voltage determined by the calibration search routine (e.g., of the same cycle for coil energization/de-energization). In an embodiment, the de-energization offset for the second selected offset emulation voltage is determined in response to the time period (for offsetting the loop delay) associated with the energization offset of the first selected offset emulation voltage and in response to the estimated slope of the coil current 1010 (and/or voltage 1050) over time period 1054.

As the voltage 1050 rises above the level of the second selected offset emulation voltage, the low-side gate voltage 1040 is driven low (e.g., de-asserted) such that the lower FET is turned off. When the lower FET is turned off, the coil current 1010 starts to rise from negative level 1022 such that after the coil current 1010 rises above the zero reference 1002 level, the current coil 1010 oscillates as ringing 1032. Also when the lower FET is turned off, the VSNS signal is negative (e.g., reaching the negative-voltage undershoot peak voltage level 1054) in the overshoot condition. During the undershoot condition, the VSNS signal decreases to a −Vd (negative forward body diode voltage) voltage, where the negative-voltage undershoot peak voltage level 1056 is reached during the undershoot condition.

Figure 11:
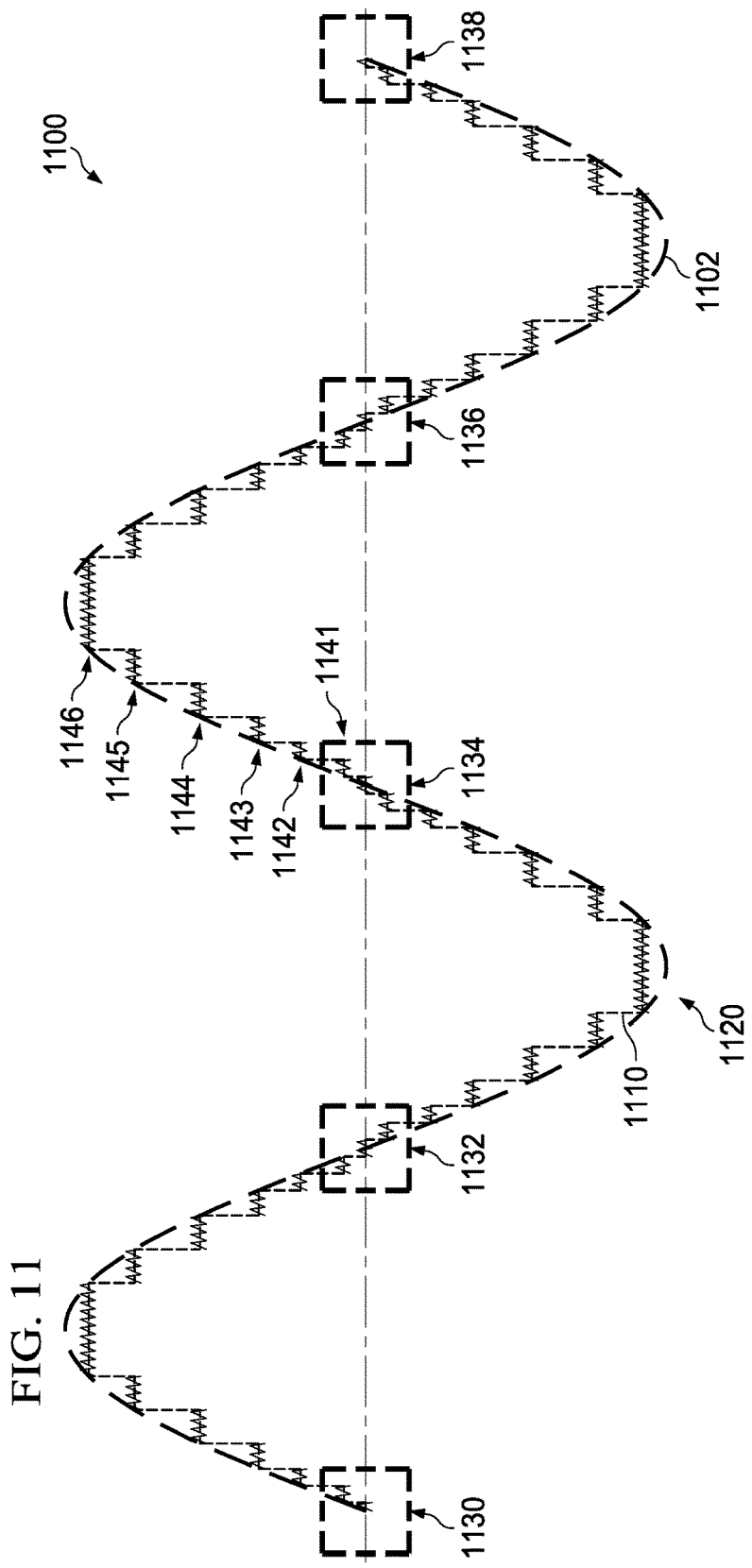
FIG. 11 is a waveform diagram 1100 illustrating loop-delay timing information extraction for stepper motor error reduction in accordance with embodiments of the present disclosure.

FIG. 11 is a waveform diagram 1100 illustrating loop-delay timing information extraction for stepper motor error reduction in accordance with embodiments of the present disclosure. The waveform diagram 1100 includes an ideal (e.g., notional) sinusoidal waveform 1102 for indicating an ideal current for driving an (e.g., ideal) stepper motor through a full rotation. The full rotation is divided into various microsteps such as microstep 1120. For each microstep the current for driving (and/or controlling) the stepper motor is regulated over a time period (e.g., 1120). Over each such time period, the regulated current has a sawtooth appearance in which the regulated current rises and falls in accordance with the associated microstep and errors in positioning of the stepper motor as determined by the control loop for regulating the stepper motor drive current.

The sinusoidal waveform 1102 has positive phases and negative phases such that the sinusoidal waveform 1102 crosses the zero current level (e.g., zero crossing) between adjacent positive and negative phases. Accordingly, zero-crossing windows 1130, 1132, 1134, 1136, and 1138 are time windows in which at least microstep can be programmed such that each of multiple cycles (where one cycle, for example, is illustrated as a single "sawtooth" in FIG. 8) has crosses the zero current level (e.g., has a zero crossing). The calibration (e.g., selection of a non-provisional offset) can be performed during any (including all) such zero-crossing windows such a selected offset can be used in succeeding (e.g., successive) microsteps. For example, a selected offset (e.g., energizing and/or de-energizing offset) selected during a calibration occurring during the time window 1134 is used to offset the loop delay of the associated control loop regulating the current drive levels for each of the 1141, 1142, 1143, 1144, 1145, and 1146 microsteps. Accordingly, higher accuracies of current regulation are achieved when the calibration is performed every half-wave (e.g., at each zero crossing of the sinusoidal waveform 1102).

Figure 12:
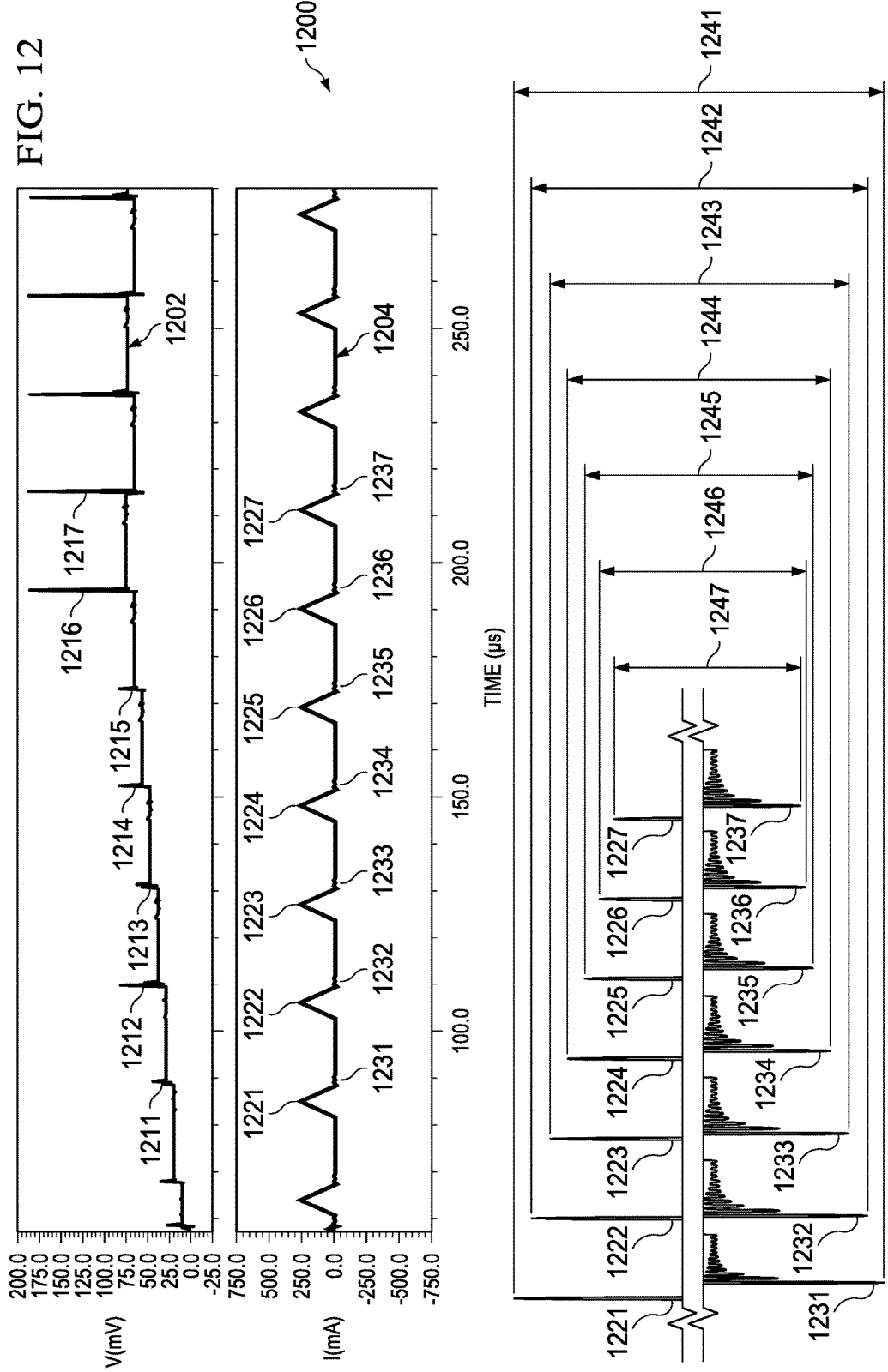
FIG. 12 is a waveform diagram 1200 illustrating reduction of error during a zero crossing calibration routine for stepper motor error reduction in accordance with embodiments of the present disclosure.

FIG. 12 is a waveform diagram 1200 illustrating reduction of error during a zero crossing calibration routine for stepper motor error reduction in accordance with embodiments of the present disclosure. The waveform diagram 1200 includes a DAC (e.g., 228) output voltage 1202 and a stepper motor control current 1204.

The DAC output voltage 1202 is the output voltage of an offset DAC such as the offset DAC 228. The DAC output voltage 1202 is the output voltage generated in response to the a selected energizing offset. The output voltage generated in response to a selected de-energizing offset is not shown, although the output voltage generated in response to a selected de-energizing offset is similar (albeit with different polarities) to the illustrated DAC output voltage 1202. During the calibration search routine, the selected offset is gradually increased over successive cycles (e.g., that include coil current zero crossings) to determine the closet (e.g., last) energization offset that results in an overshoot condition. Accordingly, the DAC output voltage 1202 (with the exception of during switching times) switches to adjusted at each of switching times 1211, 1212, 1213, 1214, 1215, 1216, and 1217.

The stepper motor control current 1204 is the coil current generated in response to a control loop, such the control loop of the microstepper control circuit 220 of the zero-crossing-calibrated microstepper 200. Each cycle includes a positive current peak (e.g., 1221, 1222, 1223, 1224, 1225, 1226, and 1227, respectively) and a negative current peak (e.g., 1231, 1232, 1234, 1235, 1236, and 1237, respectively). The degree of the excursion from a positive current peak to the following current peak is an indication of the error (errors 1241, 1242, 1243, 1244, 1245, 1246, and 1247, respectively) resulting from the loop delay of the control loop for regulating the coil current.

As each successive iteration in the calibration search routine is performed, the error associated with the loop delay is progressively diminished as demonstrated by the illustrated magnified (at the same scale) portions of the coil current of a simulation of the calibration search routine. For example, the DAC offset value before the switching time 1211 results in an overshoot condition for the cycle associated with the positive current peak 1221 and negative current peak 1231. No overshoot is detected so the DAC offset is adjusted upwards (e.g., to provide greater compensation to help counteract the loop delay) at switching time 1211. The increased value of the DAC offset changes the trigger point of the next cycle such that the error 1242 (associated with the positive current peak 1222 and negative current peak 1232) is less than the error 1241 (associated with the positive current peak 1221 and negative current peak 1231).

The DAC offset is increased for each of the following cycles until detecting the undershoot condition resulting from the DAC offset programmed at switching time 1226 (whereupon the DAC offset is programmed at switching time 1227 with the last DAC offset value that did not result in an undershoot condition detected for a cycle). In an embodiment, the calibration routine is continued until a microstep value is used that does not include a zero crossing (e.g., such that the body diode effect does not reflect an undershoot or an overshoot condition).

In an embodiment, the length of the loop delay is determined, for example, by adjusting the amount of compensation for (e.g., to counteract) the loop delay each cycle and determining whether an undershoot condition is achieved for respective cycle. The determination of whether an undershoot condition is achieved for the respective cycle by is made in the embodiment by determining the effect of the lower FET body diode on the voltage developed in response to the coil current as (e.g., during and shortly afterwards) the lower FET is switched off after the coil is at least partly de-energized.

Figure 13:
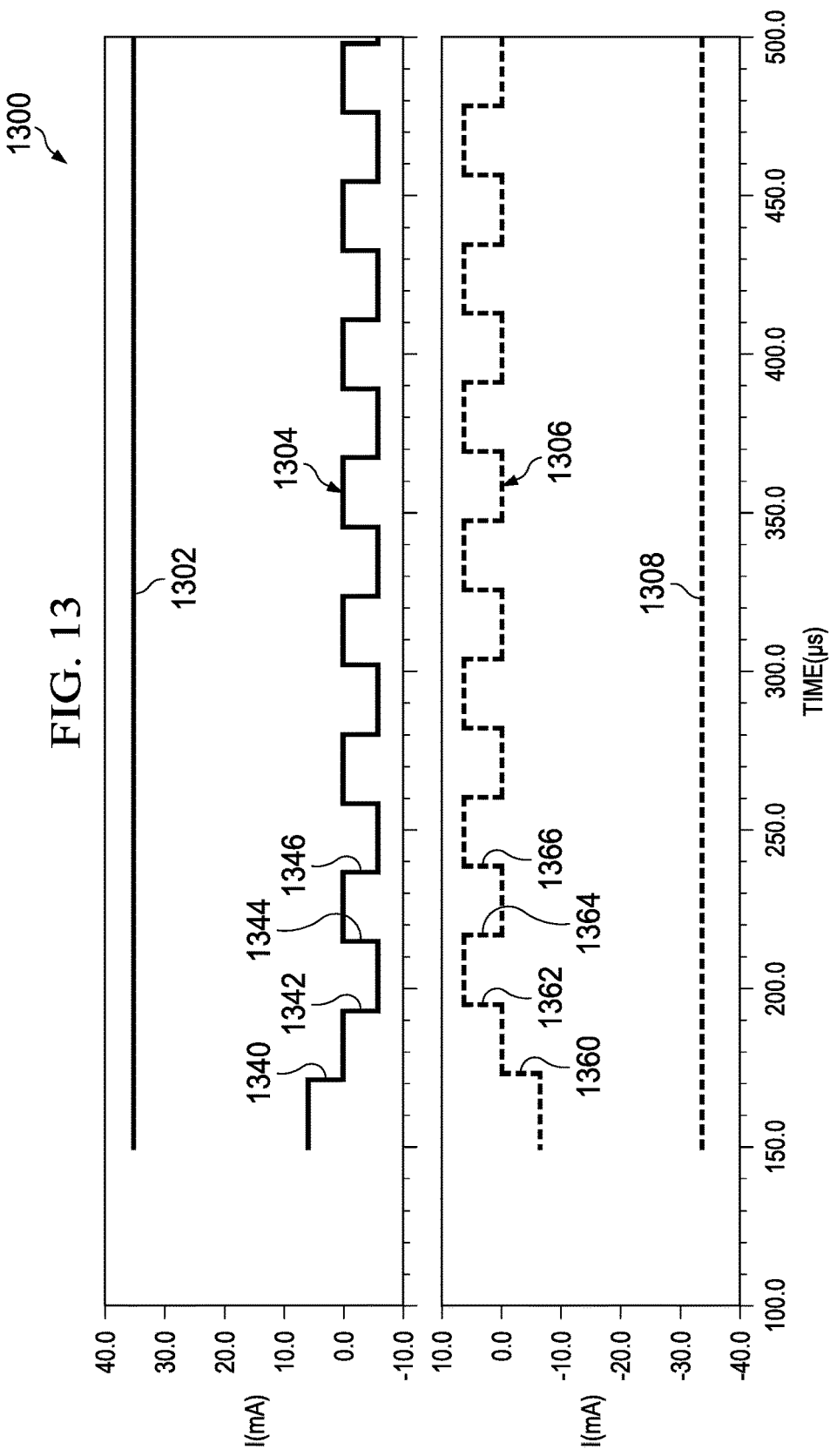
FIG. 13 is a waveform diagram 1300 illustrating a comparison of degree of current errors between a simulation of a stepper motor without calibration and a simulation of a stepper motor using stepper motor error reduction in accordance with embodiments of the present disclosure.

FIG. 13 is a waveform diagram 1300 illustrating a comparison of degree of current errors between a simulation of a stepper motor without calibration and a simulation of a stepper motor using stepper motor error reduction in accordance with embodiments of the present disclosure. The waveform diagram 1300 includes a uncompensated Itrip current error 1302 (in mA), a compensated Itrip current error 1304 (in mA), a compensated zero crossing error 1306 (e.g., the current error in mA when the coil current goes negative while the coil is de-energized), and an uncompensated zero crossing error 1308 (in mA).

Waveform 1302 illustrates the (uncompensated) Itrip current error for a simulation for a targeted Itrip level of 248.9 mA of a circuit operating at 25° C., a coil having an inductance of 0.5 mH, and an (e.g., nominal) motor output voltage of 40 Volts. As indicated, the Itrip current error for the simulation is around 35 mA over the simulation period.

Waveform 1304 illustrates the compensated (e.g., self-calibrated, as disclosed herein) Itrip current error for a simulation for a targeted Itrip level of 248.9 mA of a circuit operating at 25° C., a coil having an inductance of 0.5 mH, and an (e.g., nominal) motor output voltage of 40 Volts. As indicated, the compensated Itrip current error for the simulation converges (e.g. at step 1340) to values around 0 mA. For example, at step 1342 an undershoot was not detected and the compensation (e.g., energizing offset) increased such that the lower FET is turned on before the energizing current reaches the Itrip level (which results in about a minus 6 mA error at step 1342). At step 1344 an undershoot is detected and the compensation decreased such that the lower FET is turned on around the time the energizing current reaches the Itrip level (which results in about a 0 mA error at step 1344). The calibration step is repeated (e.g., until a non-zero-crossing microstep is selected) such that the remaining errors average between the two values alternated between after the calibration routine converges around an offset substantially representing the control loop delay.

Waveform 1306 illustrates the compensated (e.g., self-calibrated, as disclosed herein) zero crossing current error for a simulation for a circuit operating at 25° C., a coil having an inductance of 0.5 mH, and an (e.g., nominal) motor output voltage of 40 Volts. As indicated, the compensated zero crossing current error for the simulation converges (e.g. at step 1360) to values around 0 mA. For example, at step 1362 an undershoot was not detected and the compensation (e.g., de-energizing offset) increased such that the lower FET is turned off after the de-energizing current crosses 0 mA (e.g., changes direction, which results in about a positive 6 mA error at step 1362). At step 1364 an undershoot is detected and the compensation decreased such that the lower FET is turned off around the time the de-energizing current reaches the zero crossing (which results in about a 0 mA error at step 1344). The calibration step is repeated (e.g., until a non-zero-crossing microstep is selected) such that the remaining errors average between the two values alternated between after the calibration routine converges.

Waveform 1308 illustrates the (uncompensated) zero crossing error of a circuit operating at 25° C., a coil having an inductance of 0.5 mH, and an (e.g., nominal) motor output voltage of 40 Volts. As indicated, the zero crossing current error for the simulation is around minus 34 mA over the simulation period.

Figure 14:
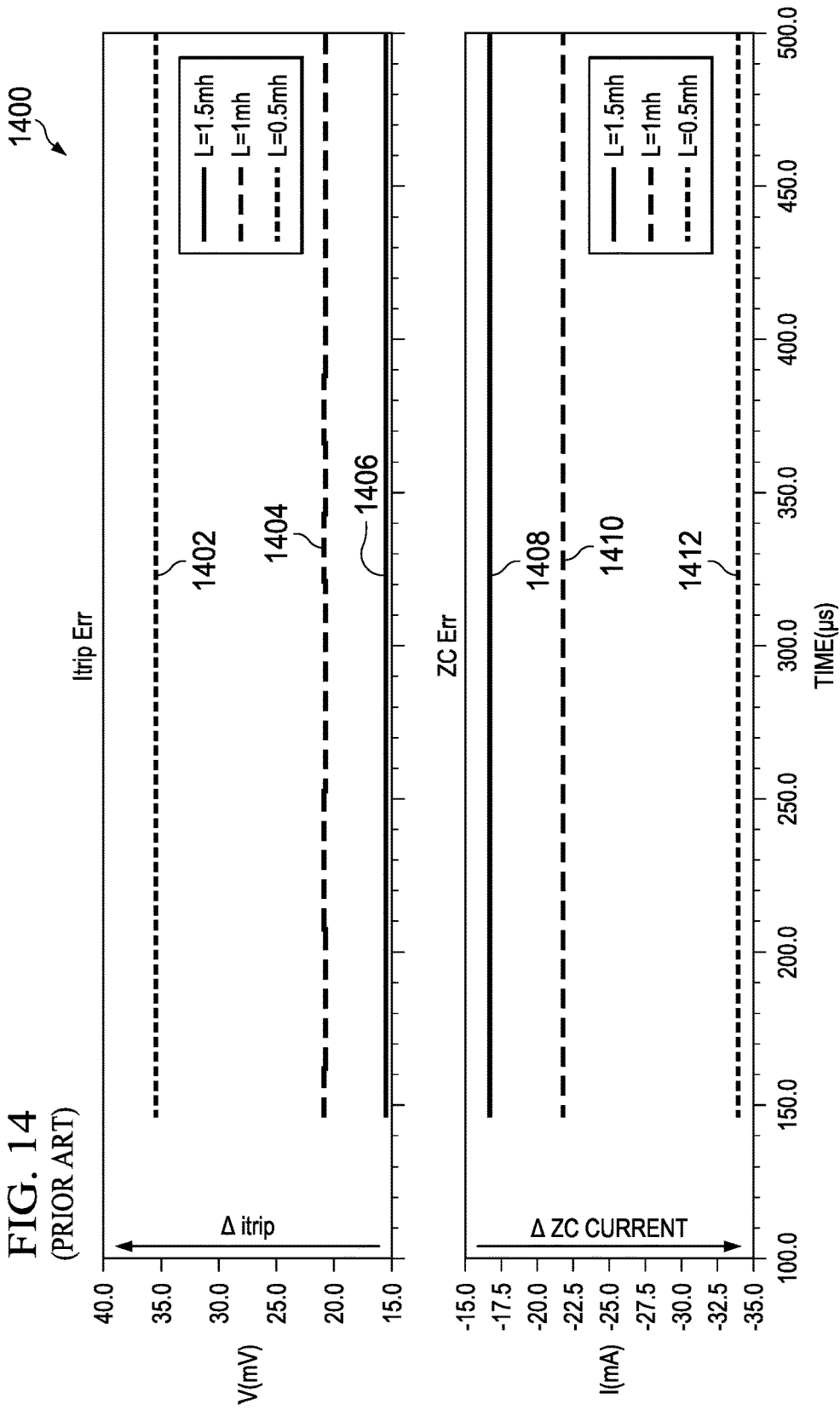
FIG. 14 is a waveform diagram 1400 illustrating relative degrees of voltage errors in simulations of a stepper motor without calibration at various levels on coil inductance.

FIG. 14 is a waveform diagram 1400 illustrating relative degrees of voltage errors in simulations of a stepper motor without calibration at various levels on coil inductance. The waveform diagram 1400 includes an uncompensated Itrip voltage error 1402 (in mV), an uncompensated Itrip voltage error 1404 (in mV), an uncompensated Itrip voltage error 1406 (in mV), an uncompensated zero crossing error 1408 (in mA), an uncompensated zero crossing error 1410 (in mA), and an uncompensated zero crossing error 1412 (in mA).

Waveforms 1402, 1404, and 1406 illustrate the non-linear increase of (uncompensated) Itrip voltage errors for a simulation for a targeted Itrip level of 166.5 mA of a circuit operating at 25° C., where the voltage errors are progressively greater at lower levels of coil inductance. For example, a coil having an inductance of 0.5 mH results in an Itrip error of around 36 mV (per waveform 1402), a coil having an inductance of 1.0 mH results in an Itrip error of around 21 mV (per waveform 1404), and a coil having an inductance of 1.5 mH results in an Itrip error of around 15 mV (per waveform 1406).

Waveforms 1408, 1410, and 1412 illustrate the non-linear increase of (uncompensated) zero crossing (ZC) current errors for a simulation for a targeted Itrip level of 166.5 mA of a circuit operating at 25° C., where the current errors are progressively greater at lower levels of coil inductance. For example, a coil having an inductance of 1.5 mH results in a zero crossing error of around minus 16 mA (per waveform 1408), a coil having an inductance of 1.0 mH results in a zero crossing error of around minus 22 mA (per waveform 1410), and a coil having an inductance of 0.5 mH results in a zero crossing error of around minus 34 mV (per waveform 1412). Accordingly, accuracies of regulation becomes progressively (if not exponentially) greater when driving, for example, ever-smaller motors having coils with increasingly smaller inductances.

Figure 15:
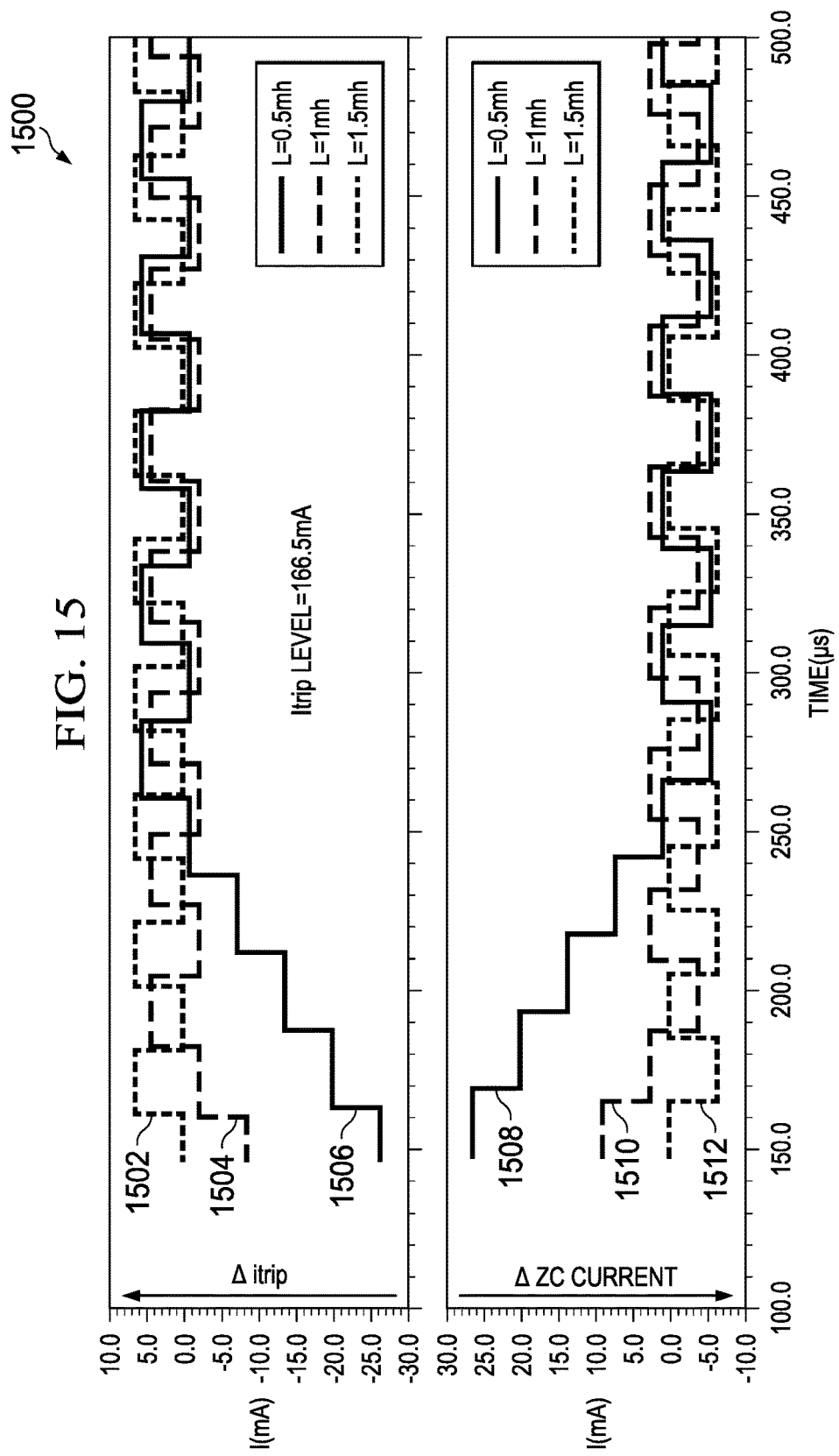
FIG. 15 is a waveform diagram 1500 illustrating a comparison of degree of current errors of simulations of a stepper motor over different coil inductances and using stepper motor error reduction in accordance with embodiments of the present disclosure.

FIG. 15 is a waveform diagram 1500 illustrating a comparison of degree of current errors of simulations of a stepper motor over different coil inductances and using stepper motor error reduction in accordance with embodiments of the present disclosure. The waveform diagram 1500 includes a compensated Itrip current error waveform 1502 (in mA), a compensated Itrip current error waveform 1504 (in mA), a compensated Itrip current error waveform 1506, a compensated zero crossing error waveform 1508 (in mA), a compensated zero crossing error waveform 1510 (in mA), and a compensated zero crossing error waveform 1512 (in mA).

Waveforms 1502, 1504, and 1506 illustrate the non-linear reduction of current errors for a simulation using the disclosed error reduction for a targeted Itrip level of 166.5 mA of a circuit operating at 25° C. The simulation waveforms indicate the progressively greater current errors resulting from lower coil inductances are effectively reduced to levels substantially around the current errors resulting from higher coil inductances.

For example, waveform 1502 demonstrates disclosed error reduction for a coil having an inductance of 1.5 mH and a (e.g., converged) Itrip error averaging around 3 mA (where the simulation scaling shows the disclosed error reduction has already converged on an optimum offset). The waveform 1504 demonstrates disclosed error reduction for a coil having an inductance of 1.0 mH, where an earlier Itrip error of around minus 8 mA is reduced as the disclosed error reduction converges to an optimum offset yielding an average Itrip error around 0 mA. The waveform 1506 demonstrates disclosed error reduction for a coil having an inductance of 0.5 mH, where an earlier Itrip error of around minus 26 mA is reduced as the disclosed error reduction converges to an optimum offset yielding an average Itrip error around 1 mA.

Waveforms 1508, 1510, and 1512 illustrate the non-linear increase of (uncompensated) zero crossing (ZC) current errors for a simulation for a targeted Itrip level of 166.5 mA of a circuit operating at 25° C., where the current errors are progressively greater at lower levels of coil inductance. For example, the waveform 1508 demonstrates disclosed error reduction for a coil having an inductance of 0.5 mH, where an earlier zero crossing error of around minus 27 mA is reduced as the disclosed error reduction converges to an optimum offset yielding an average zero crossing error around minus 2 mA. The waveform 1510 demonstrates disclosed error reduction for a coil having an inductance of 1.0 mH, where an earlier zero crossing error of around 9 mA is reduced as the disclosed error reduction converges to an optimum offset yielding an average zero crossing error around minus 1 mA. The waveform 1512 demonstrates disclosed error reduction for a coil having an inductance of 1.5 mH and a zero crossing averaging around minus 3 mA (where the simulation scaling shows the disclosed error reduction has already converged on an optimum offset). In accordance with the disclosure herein, the scaling of stepper motors to ever smaller coil inductances (and higher voltages) is not necessarily limited by non-linear increases in errors.

The various embodiments described above are provided by way of illustration only and should not be construed to limit the claims attached hereto. Those skilled in the art will readily recognize various modifications and changes that could be made without following the example embodiments and applications illustrated and described herein, and without departing from the true spirit and scope of the following claims.

What is claimed is:

1. A microstepper control circuit comprising:
   (a) a sensing voltage input;
   (b) a current generator having a current output;
   (c) an emulation field effect transistor having a source and a drain coupled between the current output and a ground and providing an emulation voltage between the emulation field effect transistor and the current generator;
   (d) a digital calibrator having an input coupled to the sensing voltage input and a determined offset code output;
   (e) an offset digital to analog converter having an input coupled to the emulation voltage, an input coupled to the determined offset code output, and an offset emulation voltage output;
   (f) comparator circuitry having a first input coupled to the sensing voltage input, a second input coupled to the offset emulation voltage output, and an output; and
   (g) pulse width modulation circuitry having an input coupled to the output of the comparator and an output coupled to a gate of the emulation field effect transistor.

2. The microstepper control circuit of claim 1 in which the current generator is a sine digital-to-analog converter current generator.

3. The microstepper control circuit of claim 1 in which the current generator is programmable.

4. The microstepper control circuit of claim 1 in which the offset digital to analog converter selectively offsets the emulation voltage in response to the determined offset code.

5. The microstepper control circuit of claim 1 in which the digital calibrator includes an input coupled to the pulse width modulation circuitry.

6. The microstepper control circuit of claim 1 in which the drain of the emulation field effect transistor is coupled to the current generator and the source is coupled to the ground through a resistor.

7. The microstepper control circuit of claim 1 in which the first input of the comparator circuitry is a non-inverting input and the second input is an inverting input.

8. A process comprising:
   (a) generating a first control signal to turn on and off a first transistor for energizing a stepper motor coil;
   (b) generating a second control signal after the first control signal turns off the first transistor to turn on and off a second transistor for de-energizing the stepper motor coil;
   (c) detecting a polarity of a first body diode voltage of the second transistor when the second control signal is turned off;
   (d) offsetting a first emulation voltage from a first emulation transistor in response to the detected polarity of the first body diode voltage of the second transistor to generate a first offset emulation voltage;
   (e) comparing the first offset emulation voltage to the first body diode voltage; and
   (f) adjusting the turn off time of the second control signal in response to the comparing.

9. The process of claim 8 including:
   (a) generating a third control signal to turn on and off a third transistor for energizing the stepper motor coil;
   (b) generating a fourth control signal after the third control signal turns off the third transistor to turn on and off a fourth transistor for de-energizing the stepper motor coil;
   (c) detecting a polarity of a second body diode voltage at the fourth transistor when the fourth control signal is turned off;
   (d) offsetting a second emulation voltage from a second emulation transistor in response to the detected polarity of the second body diode voltage of the fourth transistor to generate a second offset emulation voltage;
   (e) comparing the second offset emulation voltage to the second body diode voltage; and
   (f) adjusting the turn off time of the fourth control signal in response to the comparing.

10. The process of claim 8 including setting a first current generator to provide the first emulation voltage.

* * * * *